(12) United States Patent
Allen et al.

(10) Patent No.: US 9,811,500 B2
(45) Date of Patent: Nov. 7, 2017

(54) LOW LATENCY DEVICE INTERCONNECT USING REMOTE MEMORY ACCESS WITH SEGMENTED QUEUES

(71) Applicant: TSX INC., Toronto (CA)

(72) Inventors: Gregory Arthur Allen, Oakville (CA); Tudor Morosan, Toronto (CA)

(73) Assignee: TSX INC., Toronto (CA)

( * ) Notice: Subject to any disclaimer, the term of this patent is extended or adjusted under 35 U.S.C. 154(b) by 181 days.

(21) Appl. No.: 14/891,809

(22) PCT Filed: Jun. 12, 2014

(86) PCT No.: PCT/CA2014/000495
§ 371 (c)(1),
(2) Date: Nov. 17, 2015

(87) PCT Pub. No.: WO2014/197974
PCT Pub. Date: Dec. 18, 2014

(65) Prior Publication Data
US 2016/0103783 A1    Apr. 14, 2016

Related U.S. Application Data

(60) Provisional application No. 61/834,615, filed on Jun. 13, 2013.

(51) Int. Cl.
*G06F 15/167* (2006.01)
*H04L 12/64* (2006.01)
(Continued)

(52) U.S. Cl.
CPC ............ *G06F 15/167* (2013.01); *H04L 12/06* (2013.01); *H04L 12/6418* (2013.01);
(Continued)

(58) Field of Classification Search
None
See application file for complete search history.

(56) References Cited

U.S. PATENT DOCUMENTS 8,194,646 B2    6/2012   Elliott et al.
8,315,187 B1    11/2012  White
(Continued)

FOREIGN PATENT DOCUMENTS

EP    2498457 A1    9/2012

OTHER PUBLICATIONS

International Search Report issued by the Canadian Intellectual Property Office dated Sep. 2, 2014 for corresponding International Patent Application No. PCT/CA2014/000495 filed Jun. 12, 2014.
(Continued)

*Primary Examiner* — Natisha Cox
(74) *Attorney, Agent, or Firm* — Perry + Currier Inc.

(57) ABSTRACT

A writing application on a computing device can reference a tail pointer to write messages to message buffers that a peer-to-peer data link replicates in memory of another computing device. The message buffers are divided into at least two queue segments, where each segment has several buffers. Messages are read from the buffers by a reading application on one of the computing devices using an advancing head pointer by reading a message from a next message buffer when determining that the next message buffer has been newly written. The tail pointer is advanced from one message buffer to another within a same queue segment after writing messages. The tail pointer is advanced from a message buffer of a current queue segment to a message buffer of a next queue segment when determining that the head pointer does not indicate any of the buffers of the next queue segment.

26 Claims, 6 Drawing Sheets

(51) Int. Cl.
*H04L 12/06* (2006.01)
*H04L 12/879* (2013.01)
*H04L 29/08* (2006.01)
*H04L 12/863* (2013.01)

(52) U.S. Cl.
CPC ........ *H04L 47/6295* (2013.01); *H04L 49/901* (2013.01); *H04L 67/104* (2013.01)

(56) References Cited

U.S. PATENT DOCUMENTS

| | | | |
|---|---|---|---|
| 8,909,872 B1* | 12/2014 | Schlansker | G06F 12/0835 711/118 |
| 2005/0201398 A1* | 9/2005 | Naik | H04L 49/90 370/412 |
| 2009/0216910 A1 | 8/2009 | Duchesneau | |
| 2011/0069709 A1 | 3/2011 | Morris et al. | |
| 2011/0119526 A1* | 5/2011 | Blumrich | G06F 15/17381 714/16 |
| 2014/0089444 A1* | 3/2014 | Makhervaks | G06F 15/17331 709/212 |
| 2014/0281349 A1* | 9/2014 | Peters | G06F 9/5027 711/202 |

OTHER PUBLICATIONS

Written Opinion of the International Authority issued by the Canadian Intellectual Property Office dated Sep. 2, 2014 for corresponding International Patent Application No. PCT/CA2014/000495 filed Jun. 12, 2014.

International Preliminary Report of Patentability issued by the International Bureau dated Dec. 15, 2015 for corresponding International Patent Application No. PCT/CA2014/000495 filed Jun. 12, 2014.

* cited by examiner

LOW LATENCY DEVICE INTERCONNECT USING REMOTE MEMORY ACCESS WITH SEGMENTED QUEUES

CROSS-REFERENCE TO RELATED APPLICATION

This application claims priority to U.S. 61/834,615, filed Jun. 13, 2013, the entirety of which is incorporated herein by reference.

FIELD

The present specification relates generally to communications between computing devices, and more particularly to data communication using remote memory access.

BACKGROUND

Society is increasingly relying on computing devices and networks to interact and conduct business. To achieve a high level of availability demanded in critical systems, unplanned downtime caused by software and hardware defects should be reduced.

Several modern applications demand distributed, cooperative systems where computing devices are capable of communicating rapidly with each other, commonly referred to as clustered computing, grid computing, or high-performance computing. Configurations typically consist of a number of loosely-coupled or tightly-coupled computing devices that exchange data with particularly high throughput and/or low latency in order to cooperatively perform a task that is broken down into smaller, often parallel units of work distributed among the members of the cluster. These applications generally exhibit the following characteristics: (1) complex and high speed, low latency data processing, (2) reliable, high volume, low latency data exchange, and (3) high level of availability, i.e. the ability to provide end-user service on a substantially uninterrupted basis. When implemented, however, existing applications tend to tradeoff between these performance requirements, since, due to their contradictory effects on the system behavior, typical designs tend to have difficulty satisfying all of three characteristics simultaneously, as outlined in greater detail below.

The financial services industry is one example of an industry that demands highly available systems. Other industries include inventory management (order processing) systems, online gaming, and simulations, such as for meteorological predictions. Indeed, a large number of data processing activities are supported by computer systems utilizing reliable high-speed cluster communication.

Complex and high speed, low latency data processing refers to the ability to perform, in a timely fashion, a large number of computations, database retrievals/updates, etc. and the ability to reliably produce the results in as short a time interval as possible. This can be implemented through parallel processing, where multiple units of work are executed simultaneously on the same physical machine or on a distributed cluster utilizing high-speed communication links. In some systems, the outcome of each interaction depends on the outcomes of previously completed interactions. Therefore, the order in which the messages are sent and received should be maintained. The parallel aspects of linking computing devices using multiple links are, by and large, non-deterministic. For example, non-determinism can result from race conditions, scheduling tasks by the operating system, or variable network delays. For example, the time for transmitting a message across each link is unlikely to be identical due at least in part to latency issues.

Reliable, high-volume, low-latency data exchange refers to the ability to move data between computing devices cooperating in a networked cluster, observing requirements for guaranteed, in-order delivery of messages. TCP/IP is commonly used for this purpose. It is a widely used networking protocol, provides the guarantee of ordered delivery, and with recent technology advances, has become available at higher network clocking frequencies, resulting in lower latency transmission capabilities. However, TCP/IP is a complex, sophisticated protocol designed for Internet and wide-area public network applications, and as such, has a considerable number of features for network routing, congestion avoidance, bandwidth optimization, and so forth, requiring additional, processing overhead—making it a less suitable choice for applications requiring a dedicated low-latency data link.

Highly available systems attempt to ensure that percentage of availability of a given computer system is as close as possible to 100% of the expected time. Such availability can be implemented through redundant software and/or hardware, which takes over the functionality in case a component failure is detected. In order to succeed, the failover needs to replicate the data on each computing device using a reliable communication link that can guarantee serialized delivery of replicated data messages. As will be appreciated by those of skill in the art, state replication can be particularly challenging in non-deterministic systems. Additionally, to satisfy the desire for high speed and high reliability, state replication must be performed as rapidly as possible, and the results must be somehow guaranteed. TCP/IP is commonly used for this purpose as well, but its performance is sub-optimal due to the higher latency resulting from substantial processing related to its sophisticated networking features. Low latency data link technologies tend to provide a smaller set of features more appropriate to their primary intended application to dedicated point-to-point connections. Examples of low-latency data link technologies are Hypertransport, QPI, NUMAlink, Infiniband, RapidIO and PCI Express (PCIe). Different low-latency data link technologies vary in the design trade-offs between flexibility and extensibility versus latency and communication overhead. Some low-latency data link technologies, such as Hypertransport and QPI, do not support computing device interconnect, and are only designed for processor interconnect on a common circuit board. Of the data link technologies that are designed for device interconnect, some have sacrificed lowest possible latency to provide better scalability and networking features, and some require costly, proprietary hardware implementations. A growing number of modern applications require high availability and low-latency device interconnect but do not require sophisticated networking capabilities among a large number of computing devices. And yet, for these applications to perform effectively, they do require the device interconnect to provide the lowest possible latency of message exchange, and to achieve this on a cost-effective basis. To achieve the lowest possible latency, a device interconnect needs to forego features not required by a clustered application, and to minimize the number of processing steps necessary to achieve data transfer.

Remote memory access is one approach that achieves efficient data transfer. Message data is transferred directly from a sending application's memory to a receiving application's memory, without copying data to and from the computer operating system, and without intervening layers of unneeded network routing protocol processing that increase latency. Two commonly used examples of remote memory access are Remote Direct Memory Access (RDMA) and Programmed Input/Output (PIO). Infiniband and PCIe are two device interconnect technologies that support remote memory access. Infiniband is a widely used cluster interconnect that includes a network layer and adds routing information to data packets allowing support of larger networked clusters. However, Infiniband is not implemented natively on the same silicon as commonly used processors, requiring the additional step of translation between Infiniband and PCIe at each computing device endpoint, resulting in additional latency and reduced throughput. Applications requiring only small clusters of computing devices do not require complex network routing capability and the additional overhead of the network routing layer adds unnecessary latency. PCIe is a high-speed serial computer expansion bus standard that was developed primarily as a printed circuit board-level interconnect to interface expansion cards with processors on computer motherboards. PCIe has become ubiquitous in many categories of computing devices and is now natively implemented on processor silicon, further reducing its latency. The use of PCIe over external cables has only recently been developed, and its use as a cluster interconnect is not common, however the increasing performance of later versions of the PCIe standard, the availability of inexpensive PCIe networking devices and the exceptionally low latency afforded by PCIe technology makes it increasingly attractive as a low-latency device interconnect for small application clusters requiring cost-effective low-latency device interconnects.

Although remote memory access can achieve extremely low latency data transfer, it comes with some disadvantages. Because message data is delivered directly into application memory, there is no notification to the receiving application that data has arrived. Another disadvantage is that it provides no protocol for the marshalling and un-marshalling of messages at the application level. Provision of conventional queuing mechanisms at the application level to satisfy this need contributes substantial overhead processing and network transfer operations for the exchange of queue management control information, defeating the goal of achieving the lowest possible latency of message transfer. What is needed is a system and method for achieving cost-effective, low-latency, serialized, guaranteed message transfer between computing devices.

SUMMARY

According to one aspect of the present invention, a method for low-latency data communication includes writing messages at a first computing device to message buffers in a circular message queue as indicated by an advancing tail pointer. The circular message queue is mapped to remote memory in a second computing device using a remote peer-to-peer data link. The message buffers are divided into at least two queue segments, each queue segment having two or more message buffers. An advancing head pointer indicates a message buffer of one of the queue segments. The method further includes reading messages at the second computing device from the message buffers of the circular message queue as indicated by the advancing head pointer, including reading a message from a next message buffer when determining that the next message buffer has been newly written to since the head pointer last indicated the next message buffer. The method further includes advancing the tail pointer at the first computing device from one message buffer to another message buffer within a same queue segment after writing a message to the one message buffer, and advancing the tail pointer at the first computing device from a message buffer of a current queue segment to a message buffer of a next queue segment when determining that the head pointer does not indicate any of the message buffers of the next queue segment.

According to another aspect of the present invention, a computer system includes a first computing device configured to write messages to message buffers in a circular message queue as indicated by an advancing tail pointer, the circular message queue being mapped to remote memory in a second computing device. The message buffers are divided into at least two queue segments, each queue segment having two or more message buffers. The system further includes a second computing device configured to read messages from the message buffers of the circular message queue as indicated by an advancing head pointer that indicates a message buffer of one of the queue segments. The second computing device is configured to read a message from a next message buffer when determining that the next message buffer has been newly written to since the head pointer last indicated the next message buffer. The system further includes a peer-to-peer data link connecting the second computing device and the first computing device. The first computing device is configured to advance the tail pointer from one message buffer to another message buffer within a same queue segment after writing a message to the one message buffer. The first computing device is further configured to advance the tail pointer from a message buffer of a current queue segment to a message buffer of a next queue segment when determining that the head pointer does not indicate any of the message buffers of the next queue segment.

According to another aspect of the present invention, a computing device includes memory configured to store a circular message queue of message buffers divided into at least two queue segments. Each queue segment has two or more message buffers. The computing device further includes a high-speed serial expansion bus adapter card and a processor coupled to the memory and the high-speed serial expansion bus adapter card. The processor is configured to write messages to the message buffers in the circular message queue as indicated by an advancing tail pointer. The processor is further configured to replicate the circular message queue to remote memory at a remote computing device via the high-speed serial expansion bus adapter card. The processor is further configured to advance the tail pointer from one message buffer to another message buffer within a same queue segment after writing a message to the one message buffer. The processor is further configured to advance the tail pointer from a message buffer of a current queue segment to a message buffer of a next queue segment when determining that a head pointer for reading messages at the remote computing device does not indicate any of the message buffers of the next queue segment.

According to another aspect of the present invention, a computing device includes memory configured to store a circular message queue of message buffers divided into at least two queue segments. Each queue segment has two or more message buffers. The computing device further includes a high-speed serial expansion bus adapter card and a processor coupled to the memory and the high-speed serial expansion bus adapter card. The processor is further configured to replicate the circular message queue in the memory as received from a remote computing device via the high-speed serial expansion bus adapter card. The processor is further configured to read messages from the message buffers of the circular message queue as indicated by an advancing head pointer that indicates a message buffer of one of the queue segments. The processor is further configured to read a message from a next message buffer when determining that the next message buffer has been newly written to since the head pointer last indicated the next message buffer. The processor is further configured to control guard flags of the queue segments, each guard flag indicating to the remote computing device whether writing to a respective queue segment is permitted.

BRIEF DESCRIPTION OF THE DRAWINGS

Reference will now be made, by way of example only, to the accompanying drawings.

DETAILED DESCRIPTION OF THE EMBODIMENTS

Figure 1:
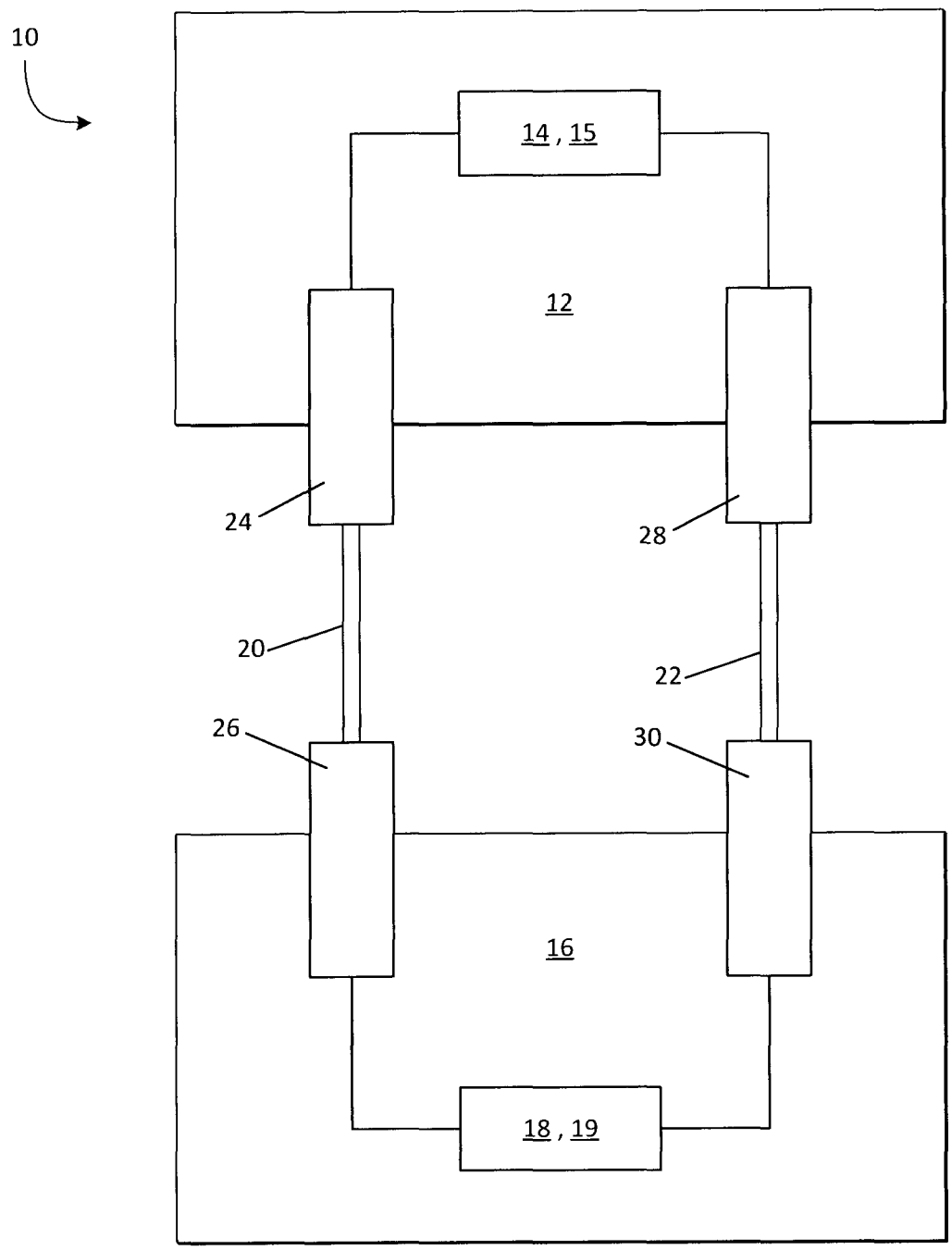
FIG. 1 is a diagram of a system for communication link failover between computing devices.

Referring now to FIG. 1, a system for a low-latency data communication link between computing devices is generally shown at 10 during normal operation. It is to be understood that the system 10 is an illustrative example and it will be apparent to those skilled in the art that a variety of systems for low-latency data communication link between computing devices are contemplated. The system 10 includes a first computing device 12 having a first processor 14 and memory 15 and a second computing device 16 having a second processor 18 and memory 19. The computing devices 12, 16 are interconnected by a first link 20 and a second link 22.

Computing devices as discussed herein may be computers, servers, or any similar device. The term "computing device" is not intended to be limiting.

More specifically, the first computing device 12 also includes a first communications interface card 24 in communication with the first processor 14 and the second computing device 16 includes a second communications interface card 26 in communication with the second processor 18 such that the first and second communications interface cards 24, 26 are connected by the first link 20. Furthermore, the first computing device 12 includes a third communications interface card 28 in communication with the first processor 14 and the second computing device 16 includes a fourth communications interface card 30 in communication with the second processor 18 such that the third and fourth communications interface cards 28, 30 are connected by the second link 22. The communications interface cards 24, 26, 28, 30 may be high-speed serial expansion bus cable adapter cards, such as Peripheral Component Interconnect Express ("PCI Express" or "PCIe") cards. In alternative embodiments, the communication interface cards 24, 26, 28, 30 may be Infiniband Host Channel Adapter (HCA) cards.

In this embodiment, the first computing device 12 is configured to remotely write to the memory 19 of the second computing device 16 using a remote memory access facility via the first and second communications interface cards 24, 26 during normal operation. The first computing device 12 is further configured to remotely write to the memory 19 of the second computing device 16 via the third and fourth communications interface cards 28, 30 if one of first and second communications interface cards 24, 26 or the first link 20 were to fail. Data messages 32 written to the memory 19 by the first computing device 12 can contain any data that is to be replicated in a reliable and failsafe manner, such as records of financial transactions and the like. To provide fast remote write access to the memory 19, the memory 19 is configured to have message buffers divided into two or more circular queue segments, where each buffer has a status flag and each segment has a guard flag controlling entry into the segment by the advancing writing pointer. An advancing writing pointer, maintained by the first computing device 12, obeys the guard flags, while a reading pointer, maintained at the second computing device 16, obeys buffer status flags. As will be apparent from the below, faster message transfer can be achieved by reducing or eliminating the need to communicate pointer position information across the links 20, 22. To provide fast remote write access in the opposite direction, to the memory 15, the memory 15 is configured to have a separate instance of a circular queue, with message buffers divided into two or more segments where each buffer has a status flag and each segment has a guard flag controlling entry into the segment by the advancing writing pointer. An advancing writing pointer, maintained by the second computing device 16, obeys the guard flags, while a reading pointer, maintained at the first computing device 12, obeys buffer status flags. Communication in each direction, using each of the circular queues, is independent of the other.

In other embodiments, the first computing device 12 is configured to remotely read from the memory 19 of the second computing device 16. In still other embodiments, each of the first and second computing devices 12, 16 is configured to perform any combination of remote reading and remote writing to the memory 19, 15. A computing device 12, 16 configured to write may be known as a writing computing device. A computing device 12, 16 configured to read may be known as a reading computing device. For bi-directional communication, each computing device 12, 16 acts as both a writing computing device and a reading computing device, with each direction implemented by a separate circular queue.

In a present embodiment, the first computing device 12 can be any type of computing device generally configured to send, receive or process a message 32, such as Hewlett Packard DL380 G8 from Hewlett-Packard Company of Palo Alto, Calif., or equivalent running a Linux operating system and having two central processing units (not shown) each operating at about 2.7 gigahertz and having about 64 gigabytes of random access memory (not shown) and a non-volatile storage device (not shown) such as a hard disc drive. Another type of computing device suitable for the first computing device 12 is an IBM 3650 M4 from International Business Machines Corp., Armonk, N.Y. Another type of computing device suitable for the first computing device 12 is a HP DL560 Gen8 Server also from Hewlett-Packard Company. However, it is to be emphasized that these particular computing devices are merely examples. A vast array of other types of computing environments for the first computing device 12 is within the scope of the disclosure. The type of messages being sent, received or processed by the first computing device 12, such as the message 32, is not particularly limited. In the present embodiment, the first computing device 12 operates in an online trading system, and is thus able to process messages that include requests to purchase, sell, etc. securities that can be traded online. For example, the first computing device 12 can be operable to maintain a central matching engine (not shown), where requests are executed against each other, and against a central repository of orders to thereby process the trading of securities.

Similar to the first computing device 12, the second computing device 16 can be any type of computing device generally configured to send, receive or process the message 32. In the present embodiment, the second computing device 16 has an identical (or at least substantially identical) computing environment as the first computing device 12. For example, the computing environment including its hardware, operating system, applications can be chosen to render the second computing device 16 operable to substitute the functionality of the first computing device 12 in the event of a failure of the first computing device. It is to be emphasized that the present embodiment is a non-limiting embodiment only and that the first computing device 12 and the second computing device 16 can each be modified. For example, in other embodiments, the first computing device 12 and the second computing device 16 can be modified to be of different types of computing environments or be of different types of computing devices configured to perform different functions based on the message 32.

The first link 20 is generally configured to carry electronic signals representing the message 32 between the first computing device 12 and the second computing device 16. In the present embodiment, the first link 20 is a high-speed serial expansion bus cable configured to carry electronic signals from the first communications interface card 24 to the second communications interface card 26 using the PCIe standard developed by the Peripheral Component Interconnect Special Interest Group ("PCI-SIG") as described in *PCI EXPRESS* 2.0 *BASE SPECIFICATION, REV* 0.9.

Figure 2:
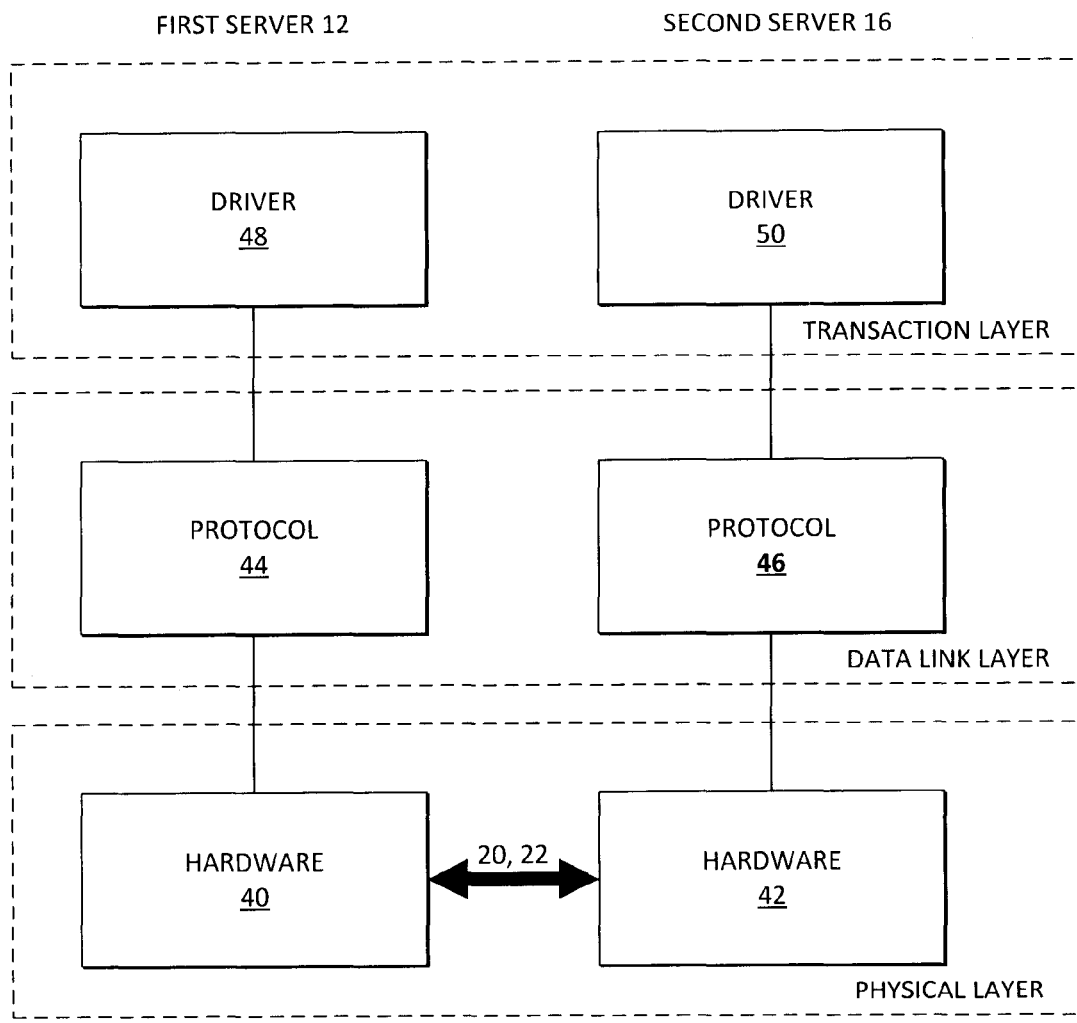
FIG. 2 is a diagram of three layers of the system.

Referring to FIG. 2, the first three layers of the system 10 in accordance with the Open Systems Interconnection ("OSI") model for characterizing the functions of a communication system are shown. It is to be appreciated that the OSI model is an example model which can be used to describe the PCIe standard and how the first computing device 12 and the second computing device 16 communicate with each other.

In the physical layer, blocks 40 and 42 represent the physical and electrical components of the first computing device 12 and the second computing device 16 respectively. The physical layer defines the relationship between the first and second computing devices 12, 16 and includes the layout of pins, voltages, cable specifications, hubs, repeaters, network adapters, host bus adapters. In the present embodiment, block 40 comprises the first communications interface card 24 and the third communications interface card 28. Block 42 comprises the second communications interface card 26 and the fourth communications interface card 30. In addition, the cables of the first link 20 and the second link 22 are also included in this layer.

In the data link layer, blocks 44 and 46 represent the protocols used to transfer data between network entities and to detect and correct errors that may occur in the physical layer. For example, the data link layer can include the Infiniband data link layer, or Myrinet.

As another example the data link layer can include Institute of Electrical and Electronics Engineers ("IEEE") 802 Local Area Network ("LAN") architecture such as IEEE 802.3. In the present embodiment, block 44 comprises the PCIe protocol data link layer operating on the first computing device 12 to provide the transport mechanism used in the physical layer and block 46 comprises the PCIe protocol data link layer operating on the second computing device to provide the transport mechanism used in the physical layer.

In the transaction layer, blocks 48 and 50 represent drivers used to handle data packets and interface to the applications on the first and second computing devices 12, 16 respectively. In particular, the drivers are primarily configured to implement a remote memory access service, such as Programmed I/O (PIO) or Remote Direct Memory Access (RDMA) for the assembly and disassembly of Transaction Layer Packets (TLPs). TLPs are used to communicate transactions, such as read and write, as well as other events. In the present embodiment, the drivers are provided by Dolphin Interconnect Solutions ASA, Innspurten 15, Helsfyr, Oslo, Norway. Therefore, it is to be appreciated, with the description provided herein, that the drivers of blocks 48 and 50 are configured to interact with the protocols of blocks 44 and 46.

In the present embodiment, the first link 20 provides a direct physical connection, such as a cable, between the first computing device 12 and the second computing device 16 based on the PCIe standard without the requirement of any intermediary protocols. In particular, all control messages, including interrupts, are sent over the same links used for data in accordance with the PCIe standard. Furthermore, the PCIe standard supports remote memory access services such that the first computing device 12 can transfer data to a memory address on the second computing device 16 as if the memory 19 of the second computing device 16 is part of the local memory 15 on the first computing device 12. In the present embodiment, PCIe drivers provided by Dolphin Interconnect Solutions ASA, Innspurten 15, Helsfyr, Oslo, Norway provide this remote memory access using Remote Direct Memory Access (RDMA) or Programmed I/O (PIO) between the first computing device 12 and the second computing device 16. In addition, the drivers also provide error codes in the event of an error such as a failed reading or writing operation. It is to be appreciated that other types of drivers, or custom designed drivers can be used with the PCIe standard to send data across the first link 20 and thus the present teachings are not tied to the Dolphin Interconnect PCIe drivers.

By basing communications on a remote memory access standard, messages 32 can be transferred directly from the memory space 15 on the first computing device 12, via the first link 20 to the memory space 19 on the second computing device 16 using fewer operations than other protocols, and without using the computing device operating system. By using fewer operations and not involving the computing device operating systems, it is to be appreciated that the system 10 decreases the latency associated with sending messages between two computing devices. Therefore, the system 10 provides a reliable high speed, low latency link for data transmission. Although the present embodiment is based on the PCIe standard, it is to be understood that transmission of data across the first link 20 is not particularly limited to the PCIe standard and that any other suitable standard can be modified for transmitting across the first link 20. For example, other standards such as RDMA over Converged Ethernet (RoCE) and iWARP can also be used for remote memory access across the first link 20. Further examples can include successors of the PCIe standard as well as any of the standards mentioned above.

In other embodiments, the protocol used to transmit across the first link 20 can also be modified to be any other type of low latency device interconnect that supports an implementation of remote memory access. Using a device interconnect that omits the overhead of the network layer, or operating system kernel processing can result in fewer operations and thus lower latency for data transfer between the computing devices 12, 16, when compared to device interconnects that involve inher ent gap recovery and traffic management, such as a transmission control protocol and internet protocol ("TCP/IP") link.

Similar to the first link 20, the second link 22 is generally configured to carry electronic signals representing messages from the first computing device 12 to the second computing device 16. In the present embodiment, the second link 22 is a cable configured to carry electronic signals from the third communications interface card 28 to the fourth communications interface card 30 based on the PCIe standard. In the present embodiment, under normal operation, the second link 22 is typically dormant such that no messages are sent over the second link 22. In other embodiments, the first link 20 and the second link 22 can share the load of message transmission to reduce the chance of traffic contention and to continuously validate the operability of both links in case one fails and the other must take over sole responsibility for transferring data.

Similar to the first communications interface card 24 and the second communications interface card 26 being configured to communicate via the first link 20, the third communications interface card 28 and the fourth communications interface card 30 are generally configured to communicate with each other via the second link 22. In the present embodiment, the third communications interface card 28 and the fourth communications interface card 30 are identical to the first communications interface card 24 and the second communications interface card 26, respectively. In other embodiments, the third communications interface card 28 and the fourth communications interface card 30 can have different capabilities from the first communications interface card 24 and the second communications interface card 26. In further embodiments, the third communications interface card 28 and the fourth communications interface card 30 can communicate using a different communication standard via the second link 22.

A queue mechanism that can be used by the computing devices 12, 16 will now be discussed. As mentioned above, one or more of the computing devices 12, 16 can be configured for RDMA or PIO to the memory of the other computing device 12, 16.

Figure 3:
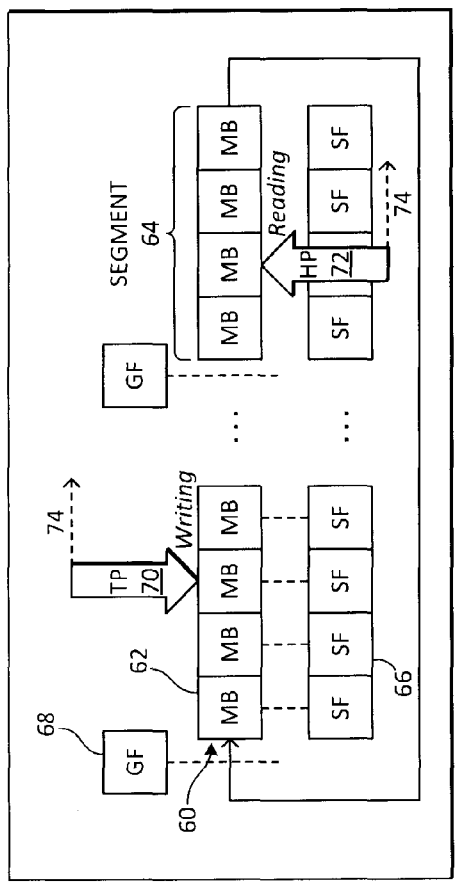
FIG. 3 is a schematic diagram of a memory queue space.

FIG. 3 shows a diagram of a memory queue space 60. The queue is configured as a circular queue with no overrun, meaning that there are a fixed number of buffers in the queue, and once the queue is full, the write operation cannot wrap around and over-write a buffer containing an un-read message. This feature prevents messages in the queue being lost due to over-writing. In this case, the write operation must wait for the read operation to free up a message buffer by reading the contents and clearing the buffer status flag, as such a write operation can only occur if empty message buffers are available to the writing entity. Furthermore, the read operation must finish reading all the message buffers in the next queue segment and grant access to this segment before the write operation may proceed. The advantage of a circular queue is that the fixed number of buffers prevents the possibility of the queue space growing without bounds, eventually depleting the memory of the computing device, resulting in a system failure. Another advantage of a circular queue in low-latency systems is that all the message buffers in the queue are pre-allocated from system main memory at start time, avoiding the relatively lengthy process of allocating a new message buffer from system main memory each time a new message is added to the queue. It is apparent that optimal latency is achieved if the writing operation never has to wait for a queue segment of available message buffers to be made available by the reading operation. It is thus advantageous to configure the system such that the reading operation occurs more frequently than the writing operation, otherwise, if the writing operation occurs more frequently than the reading operation, the queue will tend to fill up and the write operation will have to poll the queue waiting for access to be granted to the next queue segment by the read operation freeing up all of the message buffers in that segment. As will be understood from the below description, this can advantageously reduce latency, particularly in a remote memory access device interconnected system.

As discussed elsewhere herein, the queue space 60 can be used by several computing devices remote from each other and connected by a data link. Each computing device maintains in its memory a local copy of the queue space 60. One of the computing devices can be considered to reflect, map, and/or replicate the queue space 60 to the other computing device. The head or tail pointer can be maintained at the computing device that needs such. For instance, a writing computing device need only maintain the tail pointer and a reading computing device need only maintain the head pointer. Exchanging pointer locations across the data link between the computing devices is unnecessary. FIG. 3 is schematic in this sense, in that only one of the pointers illustrated need be tracked by the respective computing device.

The queue space 60 includes a plurality of message buffers 62 divided into at least two queue segments 64. The message buffers 62 can be implemented as a linked list and as a circular queue, meaning that the last buffer in the queue is linked back to the first buffer in the queue. In this embodiment, the queue space 60 is of fixed length, i.e., contains a fixed number of message buffers 62. The message buffers 62 are configured to buffer data messages, such as messages 32 shown in FIG. 1.

Each of the message buffers 62 can be of any practical size, such as one or a multitude of bytes. Each queue segment 64 can contain two or more message buffers 62, and not all queue segments 64 need have the same number of message buffers 62. Any practical number of queue segments 64 can be used, although two segments can be advantageous.

A message status flag 66 is provided for each message buffer 62. Each status flag 66 can have a length of one byte or other convenient length and, for example, can be the first or the last byte of the respective message buffer 62. One state of the status flag 66 indicates that the message in the respective message buffer 62 is valid or "en-queued" and is ready to be read. The valid state can be selected to be a non-zero value (e.g., a hexadecimal value other than 00). The other state of the status flag 66 indicates that the message in the respective message buffer 62 is invalid or "de-queued" and has already been read. The invalid state can be selected to be a zero value (e.g., a hexadecimal value of 00). The status flag 66 is checked for the valid state as a condition for reading from the respective message buffer 62. After reading the message, status flag is set to the invalid state as part of the reading operation.

A segment guard flag 68 is provided for each of the queue segments 64. Each guard flag 68 can have a length of one byte or other convenient length. One state of the guard flag 68 indicates that the respective queue segment 64 is open to receive new messages and new messages can be written to message buffers 62 in the segment 64. This condition exists as long as the read pointer is not indicating any message buffer in the segment. The open state can be selected to be a zero value (e.g., a hexadecimal value of 00). The other state of the guard flag 68 indicates that the respective queue segment 64 is closed to receiving new messages and new messages should not be written to message buffers 62 in the segment 64. This condition exists as long as the read pointer is indicating one of the message buffers 62 in the segment 64. To achieve low latency, the write operation does not check the status of each message buffer before writing, saving the time it would take to perform an additional read operation. Instead, the write pointer is only permitted to advance into a queue segment if all the message buffers are available to write. Thus, the write operation can proceed with unchecked speed through the queue segment until it reads the last message buffer in that segment. The segment guard flag 68 closed state can be selected to be a specific non-zero value (e.g., a hexadecimal value of FF). The guard flag 68 is checked for the open state as a condition for writing to the message buffers 62 in the respective queue segment 64. When messages are being read from a queue segment 64, the guard flag is set to the closed state. Upon completion of reading the last message from the queue segment 64, the guard flag 68 is set to the open state, clearing the way for the following write pointer to advance into the segment. One advantage of the use of segmented queues in this way is that, when implemented on several remote computing devices, a writing computing device does not need to keep track of the location of the head pointer, nor does it need to receive updates as the location of the head pointer changes. It only needs to update the tail pointer location locally and check for permission to advance the tail pointer into the next queue segment. This substantially reduces the number of control messages that must otherwise be exchanged between reading and writing computing devices, further improving message throughput and latency.

Two pointers 70, 72 are used to write to and read from the queue space 60. The tail pointer 70 is referenced when writing a message to a message buffer 62 and is advanced in a direction 74 through the queue space 60. The head pointer 72 is referenced when reading a message from a message buffer 62 and is advanced in the same direction 74 through the queue space 60, effectively following the tail pointer around the circular queue. Advancement of the tail pointer 70 is controlled, at least in part, by the state of the guard flag 68 of the next queue segment 64. Advancement of the head pointer 72 is controlled, at least in part, by the state of the status flag 66 of the next message buffer 62. Each guard flag 68 prevents the tail pointer 70 from entering a segment 64 that contains a message buffer 62 to which the head pointer 72 points, so that messages in the message buffers 62 of the segment 64 are protected from being prematurely overwritten. The status flags 66 prevent the head pointer 72 from advancing to a message buffer 62 that contains an already read, old message.

A method for computer memory access including reading from the queue space 60 and writing to the queue space 60 is discussed with reference to FIGS. 4 and 5. Although the method is discussed in the context of the queue space 60, the method can be applied to other memory structures.

Figure 4:
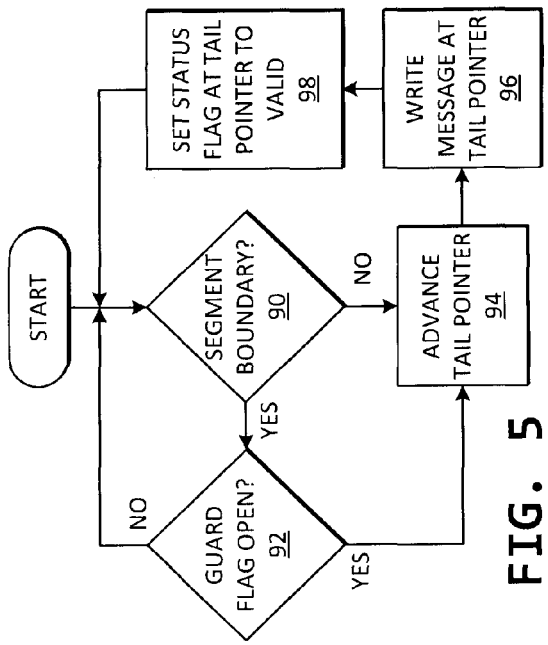
FIG. 4 is a flowchart of a process for reading from the queue space.

FIG. 4 shows a flowchart of a process for reading from the queue space 60.

At 80, the head pointer 72 is advanced from the current message buffer 62 to point to the next message buffer 62.

At 82, the message contained in the message buffer 62 is read. In this embodiment, the status flag 66 is stored in the message buffer 62 with the message, and reading the message and reading the status flag is performed at the same time. In other embodiments, the message and status flag can be stored and/or read separately. At 84, the status flag 66 is checked for the next memory buffer 62. If the status flag 66 is in the invalid state, the status flag 66 is polled thereafter until a valid state is detected.

When the status flag 66 of the next message buffer 62 is determined to be in the valid state, it is determined that the message buffer 62 has been newly written to since the status flag 66 of the message buffer 62 was last checked. That is, there is a new message in the message buffer 62.

Once the message has been successfully read, the status flag for the message buffer 62 indicated by the head pointer 72 is set to the invalid state, at 86, to indicate that the message contained within the message buffer 62 has been read and should not be read again.

At 88, a check is made to determine whether the message buffer 62 that has just been read is the last message buffer of a segment 64. That is, it is determined whether the head pointer 72 points to a message buffer 62 that is the last before the boundary with the next segment 64. If the segment boundary has not been reached, then the status flag 66 of the next message buffer 62 is polled and the method is repeated. If, on the other hand, it is determined that the just-read message buffer 62 is the last of a segment 64, then the guard flag 68 for the segment is set to the open state, which allows writing to the segment 64. In addition, the guard flag 68 for the subsequent segment 64 is set to the closed state to reserve the segment 64 for subsequent reading.

The process 80-89 described above is repeated to effect reading of messages from the message buffers 62 as indicated by the head pointer 72 and as permitted by the status flags 66.

When applied to remote memory access device interconnects, a computing device remote from the computing device that is writing the messages may be used to read the message buffers 62. Such a remote computing device may also locally maintain the head pointer 72. The computing device that is writing the message buffers 62 does not need to have access to the head pointer 72. Advantageously, only one local memory input-output operations repeatedly occurs, namely, at buffer reading 82-84, and only one remote memory input-output operation repeatedly occurs, namely, at status flag writing 86. A second remote memory input-output operation occurs less frequently, at segment boundaries during guard flag writing 88-89. It can be appreciated that the greater the number of message buffers per queue segment, the less frequently the second remote memory operation is required.

Figure 5:
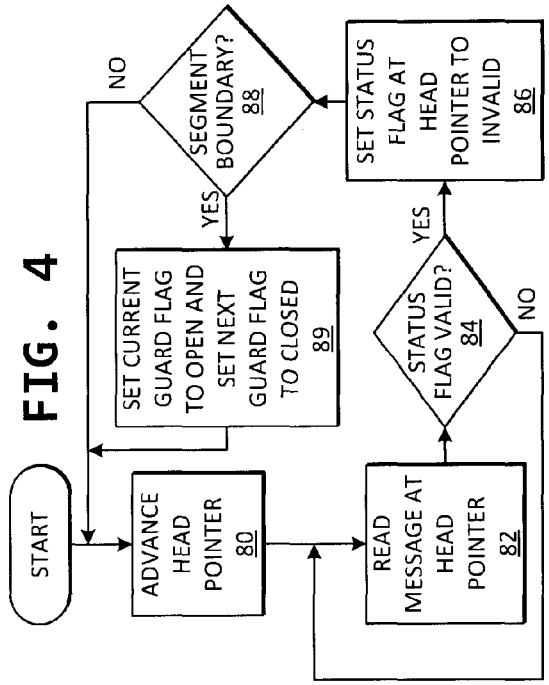
FIG. 5 is a flowchart of a process for writing to the queue space.

At the same time as the queue space 60 is being read, writing to the queue space 60 occurs as shown in the flowchart of FIG. 5.

At 90, a check is made to determine whether the message buffer 62 that has just been written to is the last message buffer of a segment 64. That is, it is determined whether the tail pointer 70 points to a message buffer 62 that is the last before the boundary with the next segment 64.

If it is determined that a segment boundary has been reached, then the guard flag 68 of the next queue segment 64 is polled, at 92, to determine whether messages can be written to the messages buffers 62 of the next segment 64. The guard flag 68 will indicate that the next segment is closed if the head pointer 72 still points to a message buffer 62 therein, and thus, the process can repeat at 90 and 92 until the segment 64 is opened. It should be apparent that a guard flag 68 need not be checked unless a segment boundary is reached, and that the tail pointer 70 can be freely advanced from one message buffer to the next message buffer within the same queue segment 64 without having to check the guard flag 68, and without risk of over-writing an un-read message buffer.

In cases where the segment boundary has not yet been reached or where the segment boundary has been reached and the guard flag indicates that the next segment is open, then, at 94, the tail pointer 70 is advanced from the current message buffer 62 to the next message buffer 62.

Then, at 96, a new message is written to the message buffer 62 indicated by the tail pointer 70, and the status flag for the message buffer 62 is set to the valid state, at 98, to reflect that the new message is ready to be read. In this embodiment, the status flag is stored together with the message in the message buffer 62. Hence, steps 96 and 98 can be performed by a single write operation that simultaneously writes the new message and sets the status flag to valid.

The process 90-98 described above is repeated to effect writing of messages to the message buffers 62 as indicated by the tail pointer 70 and as permitted by the guard flags 68.

When applied to remote memory access device interconnect, a computing device remote from the computing device that is reading the message buffers may be used to write to the message buffers 62. Such a remote computing device may also locally maintain the tail pointer 70. The computing device that is reading the message buffers 62 does not need to have access to the tail pointer 70. Advantageously, only one remote memory input-output operation repeatedly occurs, namely, at buffer and status flag writing 96-98. A local memory input-output operation occurs at segment boundaries during guard flag reading 92.

With reference to FIGS. 3-5, under normal operation, at any given time only one queue segment 64 is closed and that is the queue segment 64 in which messages are being read. The head pointer 72 closes a segment 64 when entering and opens the segment 64 when leaving. This ensures that the tail pointer 70 does not enter a segment 64 that is being read to inadvertently overwrite messages that have not yet been read. Although the advancement of the head pointer 72 opens and closes segments 64, advancement of the head pointer 72 is not regulated by the guard flags 68. Rather, the head pointer 72 is advanced based on the status flags 66 of the message buffers 62 to only move to a next message buffer 62 when the next message buffer contains a valid, unread message.

It is advantageous that writing is conditional on the status of a segment of several message buffers, while reading is conditional on the status of each message buffer. Thus, there is no contention or opportunity for a race condition between the reader and the writer trying to access the same control flag. For the computing device performing the writing, latency is decreased because a segment 64 of several message buffers 62 need only be determined to be open once before writing to all of the message buffers 62 in that segment. That is, the local polling of the guard flag 68 ends with opening of all of the message buffers 62 in the guarded segment 64. In this scenario, at the reading computing device, polling of each status flag 66 in local memory does not govern overall latency yet ensures that old data is not mistakenly re-read. As such, the method and queue space 60 described above helps to ensure that the reading of messages (from local memory) is performed as fast as or faster than writing of messages (to remote memory).

Figure 6A:
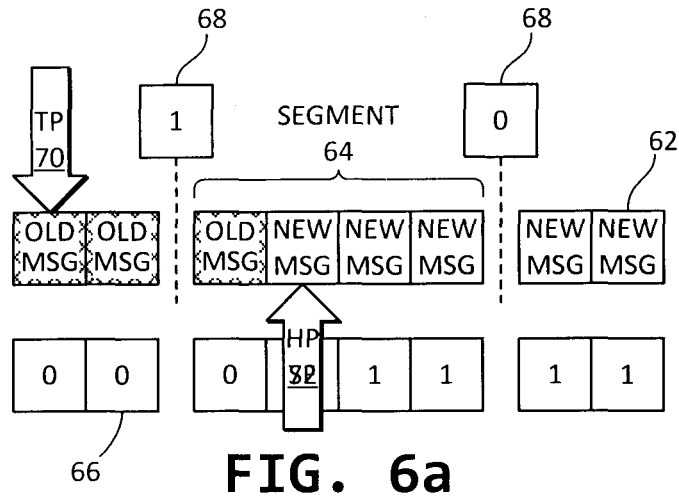
FIGS. 6a-d are diagrams of various illustrative examples of reading and writing to the queue space.
Figure 6B:
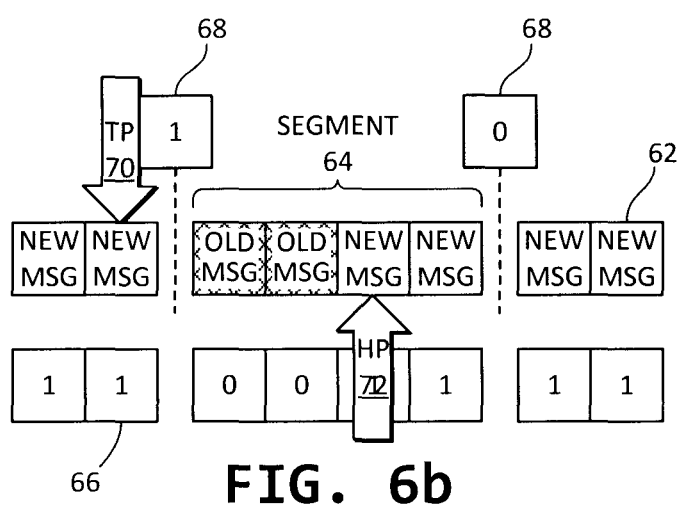
Figure 6C:
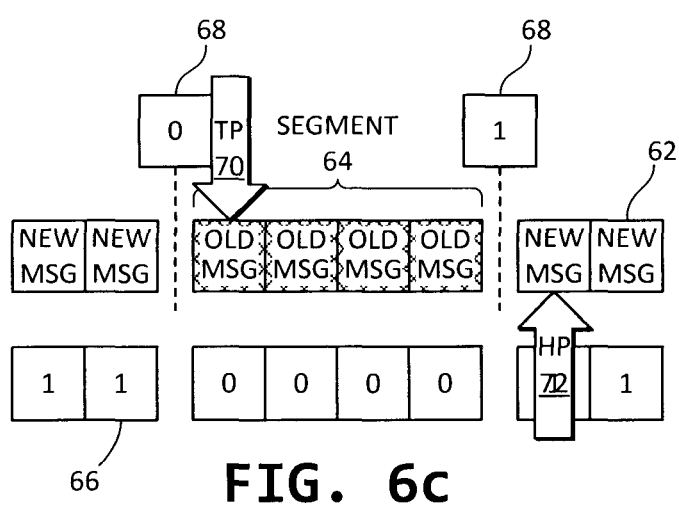

FIGS. 6a-c show an example of the above. In this example, two segments of four message buffers 62 are discussed.

As shown in FIGS. 6a and 6b, the tail pointer 70 advances, as new messages are written to message buffers 62 and the associated status flags 66 are set to the valid state (e.g., "1"), until the segment boundary is reached and it is determined that the next segment 64 has a guard flag 68 set to closed (e.g., "1"). At the same time, the head pointer 72 advances within the closed segment 64, as valid messages are read from the message buffers 62 and the associated status flags 66 are set to the invalid state (e.g., "0"). This continues until the head pointer 72 leaves the current segment 64, which opens (e.g., guard flag set to "0") the current segment 64 to the tail pointer 70 for writing of new messages, as shown in FIG. 6c. The head pointer 72 thus enters the next segment 64, which accordingly becomes closed (e.g., guard flag set to "1").

As shown in FIGS. 6a-c, the tail pointer 70 will normally never enter a segment 64 in which a message buffer 62 remains to be read. However, once a segment 64 no longer contains message buffers to be read, it is free to be written to without checking the status of the individual message buffers 62.

Figure 6D:
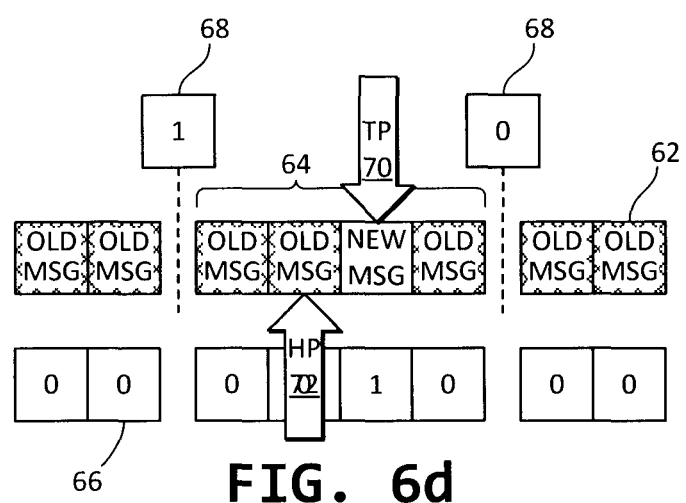

However, with reference to FIG. 6d, the head pointer 72 can enter a segment 64 in which a message buffer 62 being written to. This is because advancement of the head pointer 72 is controlled by the status flags 66 of the individual message buffers and not by characteristics of the segments 64, such as the states of the guard flags 68. In some systems, reading of messages may be performed as fast as or faster than writing of messages to the degree that FIG. 6d illustrates a normal operating condition of the queue 60, with the head pointer 72 closely trailing the tail pointer 70. In such cases, it is advantageous that advancement of the tail pointer 70 is determined with reference to segments because polling the guard flags 68, which would be normally expected to return the open state for the next segment 64, is performed less frequently than for each message buffer 62. By the same token, when writing is performed at a such a speed that the guard flag 68 for a segment 64 needs to be repeatedly polled (e.g., see FIG. 6b) while waiting for the message buffers 62 therein to be completely read, it is expected that the method performs no worse than would expected if the status flags were polled when writing.

In some embodiments, a minimum (i.e., two) of queue segments 64 are used, where each queue segment 64 has the maximum practical (or useful) number of message buffers 62. This can reduce the number of checks required on the guard flags, while reducing the proportional overhead of segment boundary crossing to message queuing.

Figure 7:
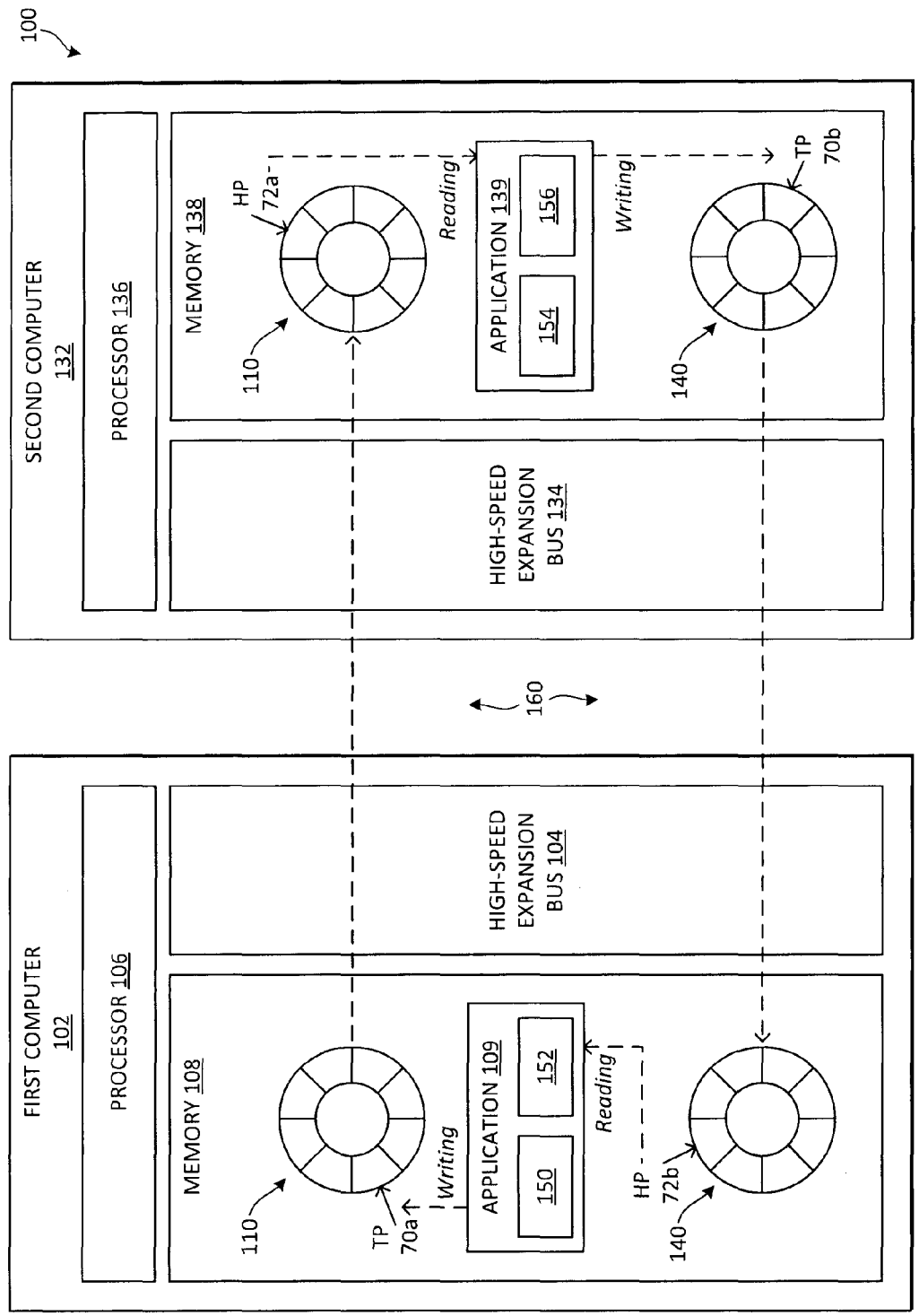
FIG. 7 is a diagram of another system that uses the queue space.

FIG. 7 illustrates an embodiment of a computer system 100 that implements the above described techniques. The computer system 100 includes a first computing device 102 and a second computing device 132. The computing devices 102, 132 are remote from each other, in that they are in different housings and may further be located in different rooms or located at geographically distinct facilities. In this embodiment, the computing devices 102, 132 each have a high-speed expansion bus 104, 134 that are connected by a high-speed serial expansion bus cable 160. The computing devices 102, 132 can be configured to implement the processes described herein by way of programming.

Each high-speed expansion bus 104, 134 can include PCIe busses/cards, and the high-speed serial expansion bus cable 160 can include a PCIe cable.

Each computing device 102, 132 further includes at least one processor 106, 136 and memory 108, 138 coupled to the processor 106, 136. Each computing device 102, 132 maintains in its memory one or more circular queues, such as a queue space 60 discussed above. In this embodiment, to accommodate bi-directional communication, the computing devices 102, 132 maintain a first circular queue 110 for messages destined for the second computing device 132, and the computing devices 102, 132 maintain a second circular queue 140 for messages bound for the first computing device 102. In embodiments where unidirectional communication is desired, one of the circular queues 110, 140 can be used. Each queue 110, 140 is mapped to both computing devices 102, 132, such that each computing device maintains a local copy of each queue 110, 140.

In this embodiment, the memory 108, 138 includes cache, random-access memory (RAM), or similar memory of the respective computing device 102, 132, and may be referred to as system memory. That is, the memory 108, 138 is controlled by the respective processor 106, 136, regardless of the presence of other components such as the high-speed expansion bus 104, 134. Further, in some embodiments, such as that depicted in FIG. 7, the high-speed expansion buses 104, 134 omit memory for storing or buffering messages, and instead directly write to and read from the system memory 108, 138 of the computing devices 102, 132.

Messages, status flags, and guard flags are written locally by the first computing device 102 to the first circular queue 110. Such information is remotely replicated across the high-speed expansion buses 104, 134 and high-speed serial expansion bus cable 160 into the memory 138 of the second computing device 132, as a remote copy of the first circular queue 110. The first computing device 102 maintains a tail pointer 70a in order to perform message writing and is further configured to obey guard flags and set status flags, as discussed above. The logic described elsewhere herein (e.g., tail pointer 70; process 90-98 of FIG. 5) is followed in that the processor 106 of the first computing device 102 is configured to advance the tail pointer 70a.

The second computing device 132 maintains a head pointer 72a for the first circular queue 110 in order to perform message reading and is further configured to check and set status flags and set guard flags, as discussed above. The logic described elsewhere herein (e.g., head pointer 72; process 80-89 of FIG. 4) is followed in that the processor 136 of the second computing device 132 is configured to read messages from message buffers as indicated by the advancing head pointer 72a.

Given that the guard and status flags control the queue 110, the first computing device 102 need not be aware of the head pointer 72a and the second computing device 132 need not be aware of the tail pointer 70a, although this is not a strict requirement.

Similarly, messages, status flags, and guard flags are written locally by the second computing device 132 to the second circular queue 140. Such information is remotely replicated across the high-speed expansion buses 104, 134 and high-speed serial expansion bus cable 160 into the memory 108 of the first computing device 102, as a remote copy of the second circular queue 140. The second computing device 132 maintains a tail pointer 70b for the second circular queue 140 in order to perform message writing and is further configured to obey guard flags and set status flags, as discussed above. The logic described elsewhere herein (e.g., tail pointer 70; process 90-98 of FIG. 5) is followed in that the processor 136 of the second computing device 132 is configured to advance the tail pointer 70b.

The first computing device 102 maintains a head pointer 72b in order to perform message reading and is further configured to check and set status flags and set guard flags, as discussed above. The logic described elsewhere herein (e.g., head pointer 72; process 80-89 of FIG. 4) is followed in that the processor 106 of the first computing device 102 is configured to read messages from message buffers as indicated by the advancing head pointer 72b.

Given that the guard and status flags control the queue 140, the second computing device 132 need not be aware of the head pointer 72b and the first computing device 102 need not be aware of the tail pointer 70b, although this is not a strict requirement.

It is advantageous that the pointers 70a, 70b, 72a, 72b need not be passed between the computing devices 102, 132, as this would consume communications resources of the expansion busses 104, 134 and connecting bus cable 160, and would furthermore increase the latency associated with message transfer.

The processor 106 of the first computing device 102 can be configured to execute an application 109 that can include a message generating process 150, such as one or more processes for data record maintenance or generation to record activity such as financial transactions, securities trades, and the like. The first computing device 102 may itself maintain or generate the data records or the message generating process 150 may be configured to receive copies of data records from another computing device, at which the data records are maintained or generated. Irrespective of where and how the message generating process 150 operates, messages 152 (such as messages 32 of FIG. 1) are generated as output. These messages 152 may be stored in long-term storage at the first computing device 102, and further, may be locally written to the first circular queue 110 and remotely replicated to the first circular queue 110 at the second computing device 132.

Similarly, the processor 136 of the second computing device 132 can be configured to execute an application 139 that can include a message generating process 154, such as one or more processes for data record maintenance or generation to record activity such as financial transactions, securities trades, and the like. The second computing device 132 may itself maintain or generate the data records or the message generating process 154 may be configured to receive copies of data records from another computing device, at which the data records are maintained or generated. Irrespective of where and how the message generating process 154 operates, messages 156 (such as messages 32 of FIG. 1) are generated as output. These messages 152 may be stored in long-term storage at the second computing device 132, and further, may be locally written to the second circular queue 140 and remotely replicated to the second circular queue 140 at the first computing device 132.

In some embodiments, the first computing device 102 can be a primary trading computing device at which the process 150 of the application 109 matches and executes trades for financial instruments. Trade information is written locally by the first computing device 102 to the first circular queue 110 and at the same time replicated to the first circular queue 110 at the second computing device 132. The second computing device 132 acts on the trade information by locally reading from the first circular queue 110 to replicate matching and execution of such trades. The second computing device 132 locally writes results or confirmations of trades to the second circular 140, which is automatically replicated to the second circular queue 140 at the first computing device 102. The first computing device 102 can locally read from the second circular queue 140 for confirmation that replication was successful. Thus, if the first computing device 102 becomes inoperable, the second computing device 132, which shares the same state, can immediately take over as the primary trading computing device without a loss of state and with minimal failover delay.

The techniques described herein for the queue 60 permit communications resources to be saved by not communicating pointers to be used in communicating messages, which increases the speed of message communication and reduces errors resulting from a pointer getting lost or corrupted in transit. Further, the queue 60 can be used as part of a high-availability state-replication system so as to provide low-latency and accurate backup to critical data, such as financial transactions and the like.

While specific embodiments have been described and illustrated, the scope of the claims should not be limited by the preferred embodiments set forth above, but should be given the broadest interpretation consistent with the description as a whole.

What is claimed is:

1. A method for low-latency data communication, the method comprising:
   writing messages at a first computing device to message buffers in a circular message queue as indicated by an advancing tail pointer, the circular message queue mapped to remote memory in a second computing device using a remote peer-to-peer data link, the message buffers divided into at least two queue segments, each queue segment having two or more message buffers, wherein an advancing head pointer indicates a message buffer of one of the queue segments;
   reading messages at the second computing device from the message buffers of the circular message queue as indicated by the advancing head pointer, including reading a message from a next message buffer when determining that the next message buffer has been newly written to since the head pointer last indicated the next message buffer;
   advancing the tail pointer at the first computing device from one message buffer to another message buffer within a same queue segment after writing a message to the one message buffer; and
   advancing the tail pointer at the first computing device from a message buffer of a current queue segment to a message buffer of a next queue segment when determining that the head pointer does not indicate any of the message buffers of the next queue segment.

2. The method of claim 1, comprising referencing a guard flag of the next queue segment to determine whether the head pointer does not indicate any of the message buffers of the next queue segment.

3. The method of claim 2, further comprising setting the guard flag to a closed state before reading a message from a first message buffer of the next queue segment.

4. The method of claim 2, further comprising setting a respective guard flag to an open state after reading a message from a last message buffer of the current queue segment.

5. The method of claim 1, comprising referencing a status flag of the next message buffer to determine whether the next message buffer has been newly written to since the head pointer last indicated the next message buffer.

6. The method of claim 5, further comprising setting a respective status flag to a valid state after writing a message to each of the message buffers.

7. The method of claim 6, further comprising setting a respective status flag to an invalid state after reading a message from each of the message buffers.

8. The method of claim 1, wherein two queue segments are used.

9. The method of claim 1, wherein reading messages is performed as fast as or faster than writing messages.

10. The method of claim 1, wherein the remote peer-to-peer data link comprises a high-speed serial expansion bus cable.

11. The method of claim 10, further comprising mapping the circular queue space to the remote memory using a kernel-bypass peer-to-peer data link service supported by a high-speed serial expansion bus adapter card at the first computing device and connected by the high-speed serial expansion bus cable to another high-speed serial expansion bus adapter card at the second computing device.

12. The method of claim 10, wherein the tail pointer is not shared with the second computing device and the head pointer is not shared with the first computing device.

13. A computer system comprising:
   a first computing device configured to write messages to message buffers in a circular message queue as indicated by an advancing tail pointer, the circular message queue mapped to remote memory in a second computing device, the message buffers divided into at least two queue segments, each queue segment having two or more message buffers;
   the second computing device configured to read messages from the message buffers of the circular message queue as indicated by an advancing head pointer that indicates a message buffer of one of the queue segments, the second computing device configured to read a message from a next message buffer when determining that the next message buffer has been newly written to since the head pointer last indicated the next message buffer;
   a peer-to-peer data link connecting the second computing device and the first computing device;
   the first computing device configured to advance the tail pointer from one message buffer to another message buffer within a same queue segment after writing a message to the one message buffer, and the first computing device configured to advance the tail pointer from a message buffer of a current queue segment to a message buffer of a next queue segment when determining that the head pointer does not indicate any of the message buffers of the next queue segment.

14. The system of claim 13, wherein the first computing device is configured to reference a guard flag of the next queue segment to determine whether the head pointer does not indicate any of the message buffers of the next queue segment.

15. The system of claim 14, wherein the second computing device is configured to set the guard flag to a closed state before reading a message from a first message buffer of the next queue segment.

16. The system of claim 14, wherein the second computing device is configured to set a respective guard flag to an open state after reading a message from a last message buffer of the current queue segment.

17. The system of claim 13, wherein the second computing device is configured to reference a status flag of the next message buffer to determine whether the next message buffer has been newly written to since the head pointer last indicated the next message buffer.

18. The system of claim 17, wherein the first computing device is configured to set a respective status flag to a valid state after writing a message to each of the message buffers.

19. The system of claim 18, wherein the second computing device is configured to set a respective status flag to an invalid state after reading a message from each of the message buffers.

20. The system of claim 13, wherein two queue segments are used.

21. The system of claim 13, the second computing device configured to read messages as fast as or faster than the first computing device is configured to write messages.

22. The system of claim 13, wherein the peer-to-peer data link comprises a high-speed serial expansion bus cable.

23. The system of claim 22, wherein each of the first computing device and the second computing device comprises a high-speed serial expansion bus adapter card that supports a kernel-bypass peer-to-peer data link service, the high-speed serial expansion bus adapter cards connected via the high-speed serial expansion bus cable.

24. The system of claim 13, wherein the tail pointer is not shared with the second computing device and the head pointer is not shared with the first computing device.

25. A computing device comprising:
memory configured to store a circular message queue of message buffers divided into at least two queue segments, each queue segment having two or more message buffers;
a high-speed serial expansion bus adapter card; and
a processor coupled to the memory and the high-speed serial expansion bus adapter card, the processor configured to write messages to the message buffers in the circular message queue as indicated by an advancing tail pointer, the processor further configured to replicate the circular message queue to remote memory at a remote computing device via the high-speed serial expansion bus adapter card;
the processor further configured to advance the tail pointer from one message buffer to another message buffer within a same queue segment after writing a message to the one message buffer;
the processor further configured to advance the tail pointer from a message buffer of a current queue segment to a message buffer of a next queue segment when determining that a head pointer for reading messages at the remote computing device does not indicate any of the message buffers of the next queue segment.

26. A computing device comprising:
memory configured to store a circular message queue of message buffers divided into at least two queue segments, each queue segment having two or more message buffers;
a high-speed serial expansion bus adapter card; and
a processor coupled to the memory and the high-speed serial expansion bus adapter card, the processor further configured to replicate the circular message queue in the memory as received from a remote computing device via the high-speed serial expansion bus adapter card;
the processor further configured to read messages from the message buffers of the circular message queue as indicated by an advancing head pointer that indicates a message buffer of one of the queue segments, the processor further configured to read a message from a next message buffer when determining that the next message buffer has been newly written to since the head pointer last indicated the next message buffer;
the processor further configured to control guard flags of the queue segments, each guard flag indicating to the remote computing device whether writing to a respective queue segment is permitted.

* * * * *